(12) United States Patent
Yoshida

(10) Patent No.: US 12,467,876 B2
(45) Date of Patent: Nov. 11, 2025

(54) SURFACE INSPECTION DEVICE, SURFACE INSPECTION METHOD, AND MANUFACTURING METHOD OF METAL STRIP

(71) Applicant: JFE STEEL CORPORATION, Tokyo (JP)

(72) Inventor: Keisuke Yoshida, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 385 days.

(21) Appl. No.: 18/014,305

(22) PCT Filed: May 28, 2021

(86) PCT No.: PCT/JP2021/020340
§ 371 (c)(1),
(2) Date: Jan. 3, 2023

(87) PCT Pub. No.: WO2022/030083
PCT Pub. Date: Feb. 10, 2022

(65) Prior Publication Data
US 2023/0349836 A1    Nov. 2, 2023

(30) Foreign Application Priority Data
Aug. 6, 2020   (JP) ................. 2020-133820

(51) Int. Cl.
*G01N 21/89*   (2006.01)
*G01N 21/88*   (2006.01)

(52) U.S. Cl.
CPC ..... *G01N 21/8914* (2013.01); *G01N 21/8903* (2013.01); *G01N 2021/8845* (2013.01); *G01N 2021/8918* (2013.01)

(58) Field of Classification Search
None
See application file for complete search history.

(56) References Cited

U.S. PATENT DOCUMENTS

| 5,087,822 A | 2/1992 | Fairlie et al. |
| 5,724,093 A | 3/1998 | Parenti |
| (Continued) | | |

FOREIGN PATENT DOCUMENTS

| CN | 107533012 A | 1/2018 |
| CN | 107533013 A | 1/2018 |
| (Continued) | | |

OTHER PUBLICATIONS

Mar. 7, 2023 Office Action issued in Japanese Patent Application No. 2021-552128.

(Continued)

*Primary Examiner* — Lennin R Rodriguezgonzalez
(74) *Attorney, Agent, or Firm* — Oliff PLC

(57) ABSTRACT

A surface inspection device of a metal strip includes: a first light source unit configured to emit light to a surface of a metal strip; a first imaging unit configured to image regular reflection light on the surface by emission light from the first light source unit; a second light source unit configured to emit light of a wavelength band different from the first light source unit to the surface; a second imaging unit configured to image irregular reflection light on the surface by emission light from the second light source unit; and a surface defect distinguishing unit configured to distinguish a surface defect by using the regular reflection light and irregular reflection light. The emission light from the first light source unit and the emission light from the second light source unit are simultaneously applied to a same place on the surface of the metal strip.

10 Claims, 8 Drawing Sheets

(56) References Cited

U.S. PATENT DOCUMENTS

| | | |
|---|---|---|
| 2009/0109430 A1 | 4/2009 | Stober |
| 2018/0017503 A1 | 1/2018 | Fukui et al. |
| 2019/0003987 A1 | 1/2019 | Fukui et al. |
| 2020/0057408 A1 | 2/2020 | Ishido |

FOREIGN PATENT DOCUMENTS

| | | |
|---|---|---|
| JP | S60-228943 A | 11/1985 |
| JP | H04-113260 A | 4/1992 |
| JP | H05-188010 A | 7/1993 |
| JP | H07-218451 A | 8/1995 |
| JP | H09-89802 A | 4/1997 |
| JP | H09-138201 A | 5/1997 |
| JP | 2001-056297 A | 2/2001 |
| JP | 2003-121371 A | 4/2003 |
| JP | 2006-317274 A | 11/2006 |
| JP | 2010-223613 A | 10/2010 |
| JP | 2017053735 A | 3/2017 |
| JP | 2019-138900 A | 8/2019 |
| JP | 2019-207114 A | 12/2019 |
| JP | 2020-027197 A | 2/2020 |
| JP | 2020-041835 A | 3/2020 |

OTHER PUBLICATIONS

Jul. 25, 2023 Office Action issued in Japanese Patent Application No. 2021-552128.
Jan. 17, 2025 Office Action issued in Korean Patent Application No. 10-2022-7046286.
Dec. 15, 2023 Extended European Search Report issued in European Patent Application No. 21853964.1.
Jul. 29, 2025 Office Action issued in Chinese Patent Application No. 202180046808.1.
Jul. 19, 2022 Office Action issued in Japanese Patent Application No. 2021-552128.
Oct. 11, 2022 Office Action issued in Japanese Patent Application No. 2021-552128.
Aug. 10, 2021 International Search Report issued in International Patent Application No. PCT/JP2021/020340.

FIG.8

(a) LIGHT RECEPTION INTENSITY INFORMATION

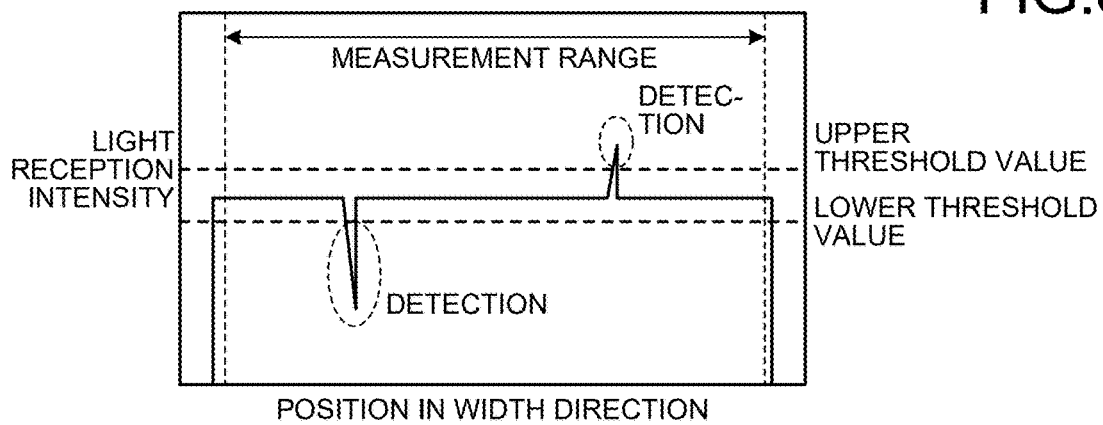

(b) TWO-DIMENSIONAL IMAGING

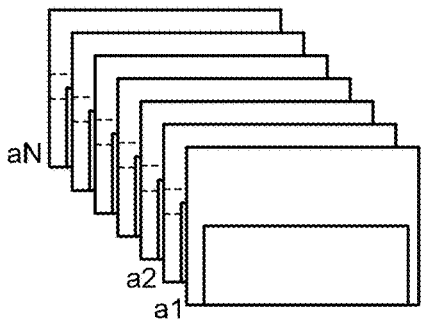

DEFECT CANDIDATE INFORMATION

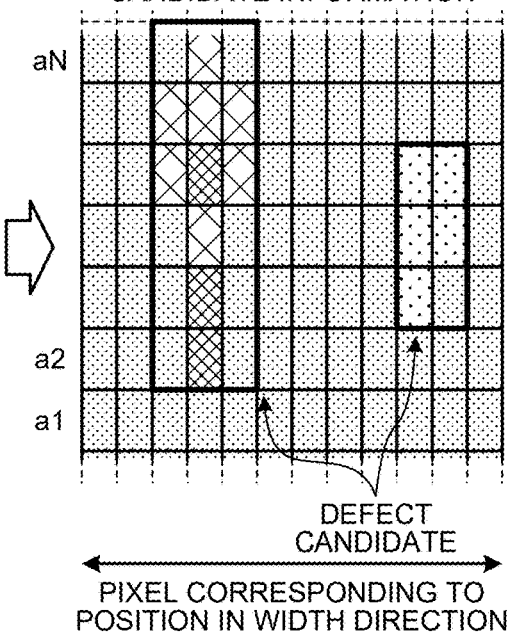

TWO-DIMENSIONAL IMAGE RELATED TO DEFECT CANDIDATE INFORMATION

DEFECT CANDIDATE

PIXEL CORRESPONDING TO POSITION IN WIDTH DIRECTION (c) DEFECT DATABASE

| TYPE | DEFECT NAME | CHARACTERISTIC AMOUNT |
|---|---|---|
| UNEVEN DEFECT | TEXTURING | A-1 |
| | CRIMPING | A-2 |
| | DENT | A-3 |
| PATTERNED DEFECT | DIRT | B-1 |
| | SCALE | B-2 |
| | RUST | B-3 |
| | BROWN | B-4 |

FIG.9
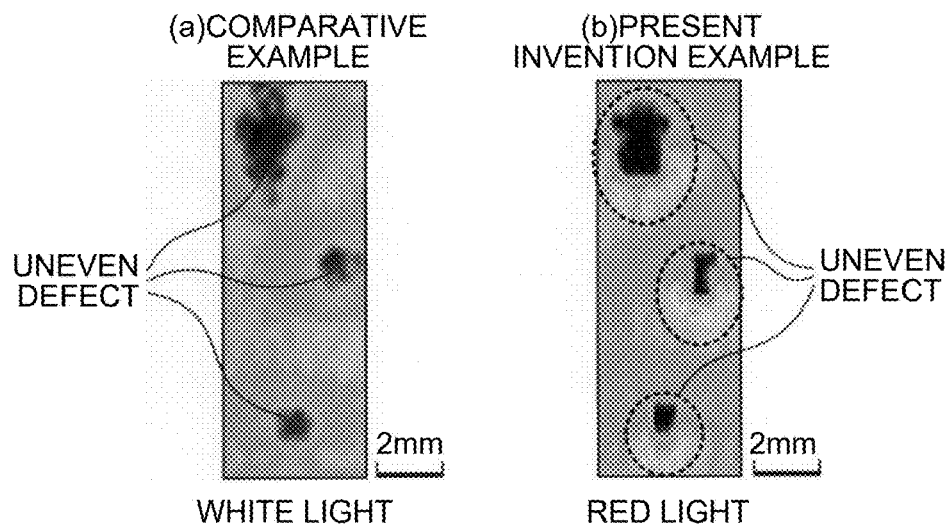
(a) COMPARATIVE EXAMPLE — WHITE LIGHT
(b) PRESENT INVENTION EXAMPLE — RED LIGHT
FIG.10
(a) COMPARATIVE EXAMPLE, WHITE LIGHT
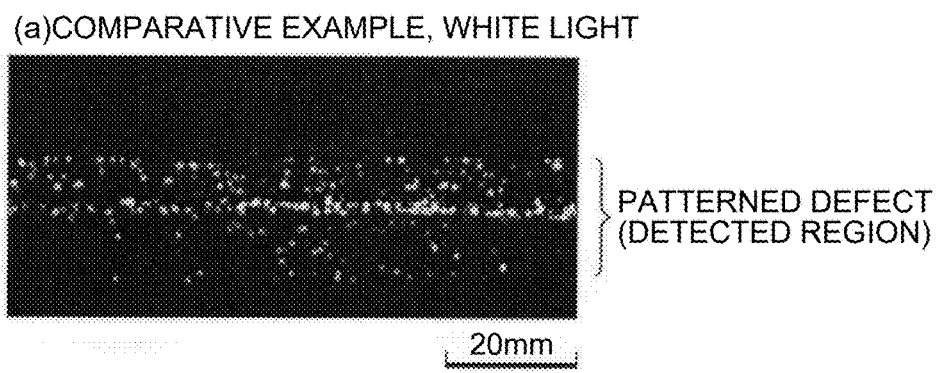
(b) PRESENT INVENTION EXAMPLE, BLUE LIGHT
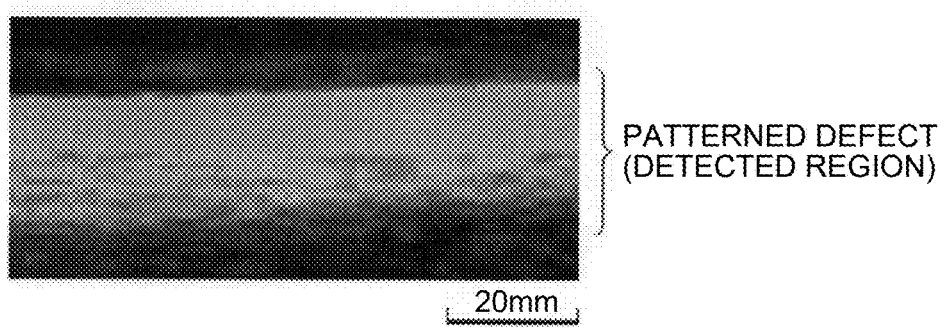

SURFACE INSPECTION DEVICE, SURFACE INSPECTION METHOD, AND MANUFACTURING METHOD OF METAL STRIP

FIELD

The present invention relates to a surface inspection device, a surface inspection method, and a manufacturing method of a metal strip for detecting and determining surface defects of a metal strip.

BACKGROUND

Metal strips typified by thin steel plates and the like become products through various manufacturing processes. For example, the slab cast in the steelmaking process is formed into a hot rolled steel strip by a hot rolling process, and after that, the slab is subjected to a plurality of manufacturing processes such as a pickling process in which an oxide on the surface is removed, a subsequent cold rolling process in which cold rolling is performed to a predetermined plate thickness, an annealing process in which the steel strip that has been hardened by working strain is softened, and a plating process and a temper rolling process which follow the annealing process. In this manner, whether or not the metal strip has predetermined characteristics and quality is appropriately inspected before the metal strip is formed into a product through a plurality of processes. This is not only for the purpose of quality assurance of the final product, but also for the purpose of judging compatibility at an intermediate stage for each metal strip, such as changing a subsequent manufacturing process or stopping the manufacturing of the metal strip in the middle in a case where a defect is detected in an intermediate process as a means of production control.

For example, in a case where a surface defect is detected in the metal strip in the pickling process, if the defect is mild, the subsequent cold rolling process may be continued, and if the defect is severe, the production may be stopped and the metal strip may be scrapped. In addition, in a case where a surface defect is detected only at the lead end portion or the tail end portion of the metal strip, there is a case where a portion where the defect is detected is removed, and only a portion of the metal strip where no defect occurs is allowed to flow to a downstream manufacturing process. The surface inspection may be performed in a plurality of processes (for example, an annealing process, a plating process, and the like) in the course of the manufacturing process of the metal strip.

On the other hand, there is a large number of types of surface defects generated in the metal strip, which are roughly classified into an uneven defect and a patterned defect. The uneven defect is a defect in which a concave portion, a convex portion, and the like are formed on the surface of the metal strip, and refers to a defect in which the uneven shape can be visually recognized to some extent. Examples of the cause of uneven defects include biting of a foreign substance, flaw transfer of a rolling roll, and adhesion of a foreign substance such as an oxide. On the other hand, the patterned defect is a defect that can be visually identified as a non-uniform pattern on the surface of the metal strip. Examples of the patterned defect include a patterned defect in which a region in which a formation state of an oxide such as rust is partially different is generated on the surface of the metal strip, a patterned defect in which a foreign substance is wound and then integrated with the metal strip by rolling and the like, a patterned defect generated by degeneration of a material due to temperature abnormality during annealing, a patterned defect observed because a deposition state of an element is partially different on the surface of the metal strip after a plating process, and a patterned defect generated due to dirt and the like due to adhesion of foreign substances.

In the manufacturing process of the metal strip, it is also an important problem to distinguish the type of the surface defect to be detected. For example, in a case where there is a large concave defect on the surface of the metal strip, there is a possibility that the metal strip breaks and large operational trouble occurs in the subsequent manufacturing process. On the other hand, in an intermediate process, there is a case where a portion including the detected concave defect is cut off or removed by a grinder and the like, and then the metal strip is transferred to a downstream process. On the other hand, in the case of a patterned defect, there is a low possibility of causing large operational trouble in a downstream manufacturing process, and therefore production is often proceeded as originally planned. At that time, depending on the type of the surface defect, some surface defects disappear due to rolling strain in the cold rolling process. In addition, if the patterned defect is a defect due to dirt, the patterned defect may flow to the downstream manufacturing process after the cleaning process. As described above, in the manufacturing process of the metal strip, distinguishing the degree (severity) and the type of the surface defect plays an important role in appropriate management of the manufacturing process.

In addition, it is extremely important to detect a surface defect and determine the degree and type of the surface defect in order to ensure the quality of a metal strip as a final product. This is because it is practically difficult to manufacture a metal strip in which no surface defect occurs, and it is impossible to avoid the presence of some surface defect at any position when manufacturing a large number of metal strips. In this case, since the metal strip to be shipped as a product is processed into a product such as a metal part through secondary processing, even if a small number of mild surface defects is included in a part of the metal strip, if the other portion is sound, the secondary processing can be performed after such a part including a small number of mild surface defects is removed. Therefore, for the metal strip to be a product, the grade of the surface quality level of the product is determined according to the number and type of the surface defects included.

For example, in a case where there is an uneven defect on the surface of the metal strip and the uneven defect is large, press die as secondary processing causes cracking of a molded product, damage to a press mold, and the like, and thus, it is judged that such a metal strip is not suitable for use in press die. On the other hand, when a thick coating film is applied in the secondary processing step even if a mild patterned defect is included, it may be judged that there is no problem in practical use.

As described above, the detection of the surface defect of the metal strip is performed not only to ensure the quality of the product but also to appropriately select the manufacturing process, and it is required to distinguish not only the degree (severity) of the surface defect that should be detected but also the type.

On the other hand, as a means for detecting a surface defect of a metal strip, a device has been used that detects a surface defect of a metal strip by irradiating a surface of a metal strip with light and obtaining an image of the reflection light. This utilizes a characteristic that in a case where unevenness is formed on the surface of the metal strip, the irradiated light is reflected differently from a normal portion, in a manner that an image at a position where the reflection light is imaged changes.

Specifically, Patent Literature 1 describes device in which a light source that irradiates a surface of a metal strip with light, a photoelectric converter that detects a regular reflection component of reflection light, and a photoelectric converter that detects an irregular reflection component are installed, and the detection sensitivity of an uneven defect is improved by utilizing a characteristic that a ratio between the regular reflection component and the irregular reflection component changes due to an uneven state of the surface of the metal strip.

Patent Literature 2 discloses a device that irradiates an object to be inspected with monochromatic light having different wavelengths from different directions, disperses reflection light of the object to be inspected into three primary colors of red, green, and blue, and distinguishes a surface defect of a metal strip from intensity levels of respective dispersed wavelength components. Furthermore, the surface defect inspection device having such a configuration can detect not only a local shape change such as a surface flaw but also color unevenness.

On the other hand, Patent Literature 3 describes a surface defect inspection device that irradiates a metal strip with laser beam corresponding to three primary colors of light from different angles and images reflection light of each color by an imaging camera corresponding to each color. In addition, a device using combined light obtained by combining general light with laser beam in order to obtain an image by irregular reflection light is described. In addition, as an embodiment, it is described that the imaging cameras corresponding to the respective colors are arranged adjacent to each other at substantially the same position to image regular reflection light from the light source.

CITATION LIST

Patent Literature

Patent Literature 1: JP H05-188010 A
Patent Literature 2: JP H04-113260 A
Patent Literature 3: JP 2003-121371 A

SUMMARY

Technical Problem

However, the conventional technique has the following problems.

The device described in Patent Literature 1 has a problem that although it is possible to detect the degree of the uneven defect on the surface of the metal strip by the ratio between the regular reflection component and the irregular reflection component of the light reflected on the surface of the metal strip, the type of the surface defect to be detected is the uneven defect, and the type of the surface defect cannot be distinguished.

The device described in Patent Literature 2 detects a surface defect by emitting monochromatic light having different wavelengths from different directions using a characteristic that irregular reflection intensity varies depending on the surface defect, but it is not possible to distinguish whether the detected surface defect is an uneven defect or a patterned defect. In addition, since it is necessary to perform defect detection while dispersing reflection light captured by a color camera, there is also a problem that a load of image processing of a captured color image increases. Therefore, it is necessary to provide an image processing system capable of special high-speed processing, and there arises a problem that the device becomes expensive as a whole.

On the other hand, the device described in Patent Literature 3 uses a plurality of imaging devices that detects laser beams corresponding to the three primary colors of light and regular reflection light corresponding to the wavelengths of the respective lights, in a manner that the spectroscopic processing by the color camera described above becomes unnecessary. However, since the laser beam is excellent in linearity, it is advantageous for detecting regular reflection light, but it is difficult to detect information of irregular reflection light. In this case, Patent Literature 3 describes that combined light obtained by combining general light with laser beam is used, but in that case, a device for generating combined light becomes large in scale, and a surface inspection device becomes expensive. In addition, in the case of the device described in Patent Literature 3, the sensitivity for detecting surface defects is improved, but it is not possible to distinguish whether the detected surface defect is an uneven defect or a patterned defect.

The present invention has been made in view of the above problems, and an object of the present invention is to provide a surface inspection device and a surface inspection method of a metal strip capable of improving detection accuracy for different types of surface defects such as an uneven defect and a patterned defect and distinguishing the type of the surface defect. In addition, another object of the present invention is to provide a manufacturing method of a metal strip capable of improving a manufacturing yield of the metal strips.

Solution to Problem

A surface inspection device of a metal strip according to the present invention includes: a first light source unit configured to emit light to a surface of a metal strip; a first imaging unit configured to image regular reflection light on the surface of the metal strip by emission light from the first light source unit; a second light source unit configured to emit light of a wavelength band different from the emission light of the first light source unit to the surface of the metal strip; a second imaging unit configured to image irregular reflection light on the surface of the metal strip by emission light from the second light source unit; and a surface defect distinguishing unit configured to distinguish a surface defect of the metal strip by using the regular reflection light imaged by the first imaging unit and irregular reflection light imaged by the second imaging unit, wherein the emission light from the first light source unit and the emission light from the second light source unit are simultaneously applied to a same place on the surface of the metal strip.

The first imaging unit may include a first optical filter unit configured to selectively transmit a wavelength component of the emission light from the first light source unit, and the second imaging unit may include a second optical filter unit configured to selectively transmit a wavelength component of the emission light from the second light source unit.

The emission light from the first light source unit may be light selected from a wavelength band having a longer wavelength than the emission light from the second light source unit.

The emission light from the first light source unit may be light selected from a warm color wavelength band, and the emission light from the second light source unit may be light selected from a cold color wavelength band.

An incident angle of the emission light from the second light source unit to the metal strip may be larger than an incident angle of the emission light from the first light source unit to the metal strip.

An optical axis of the first imaging unit may be at an angle of 0° or more and 75° or less with respect to a normal line of the metal strip, and an optical axis of the second imaging unit may be at an angle of 20° or more and less than 90° with respect to the normal line of the metal strip.

The first light source unit and the second light source unit may be linear light sources configured to linearly irradiate the surface of the metal strip with light.

A surface inspection method of a metal strip according to the present invention includes: a first emission step of emitting light to a surface of a metal strip using a first light source unit; a first imaging step of imaging regular reflection light on the surface of the metal strip by emission light from the first light source unit using a first imaging unit; a second emission step of emitting light of a wavelength band different from that of the emission light of the first light source unit to the surface of the metal strip using a second light source unit; a second imaging step of imaging irregular reflection light on the surface of the metal strip by emission light from the second light source unit using a second imaging unit; and a step of distinguishing a surface defect of the metal strip by using the regular reflection light imaged in the first imaging step and irregular reflection light imaged in the second imaging step, wherein the emission light from the first light source unit and the emission light from the second light source unit are simultaneously applied to a same place on the surface of the metal strip.

The first imaging unit may include a first optical filter unit that selectively transmits a wavelength component of the emission light from the first light source unit, and the second imaging unit may include a second optical filter unit that selectively transmits a wavelength component of the emission light from the second light source unit.

A manufacturing method of a metal strip according to the present invention includes: a step of manufacturing a metal strip while distinguishing the surface defect of the metal strip using the surface inspection method of a metal strip according to the present invention.

Advantageous Effects of Invention

According to the surface inspection device and the surface inspection method of a metal strip according to the present invention, it is possible to improve detection accuracy for different types of surface defects such as an uneven defect and a patterned defect and distinguish the type of the surface defect. In addition, according to the manufacturing method of a metal strip according to the present invention, the manufacturing yield of the metal strips can be improved.

BRIEF DESCRIPTION OF DRAWINGS

FIG. 8 is a diagram for explaining an operation example of the surface defect distinguishing unit.

FIG. 9 is a diagram illustrating a captured image of the uneven defect, (a) illustrates a comparative example, and (b) illustrates a present invention example.

FIG. 10 is a diagram illustrating a captured image of a patterned defect, (a) illustrates a comparative example, and (b) illustrates a present invention example.

DESCRIPTION OF EMBODIMENTS

[Inspection Target]

Figures 1, 2:
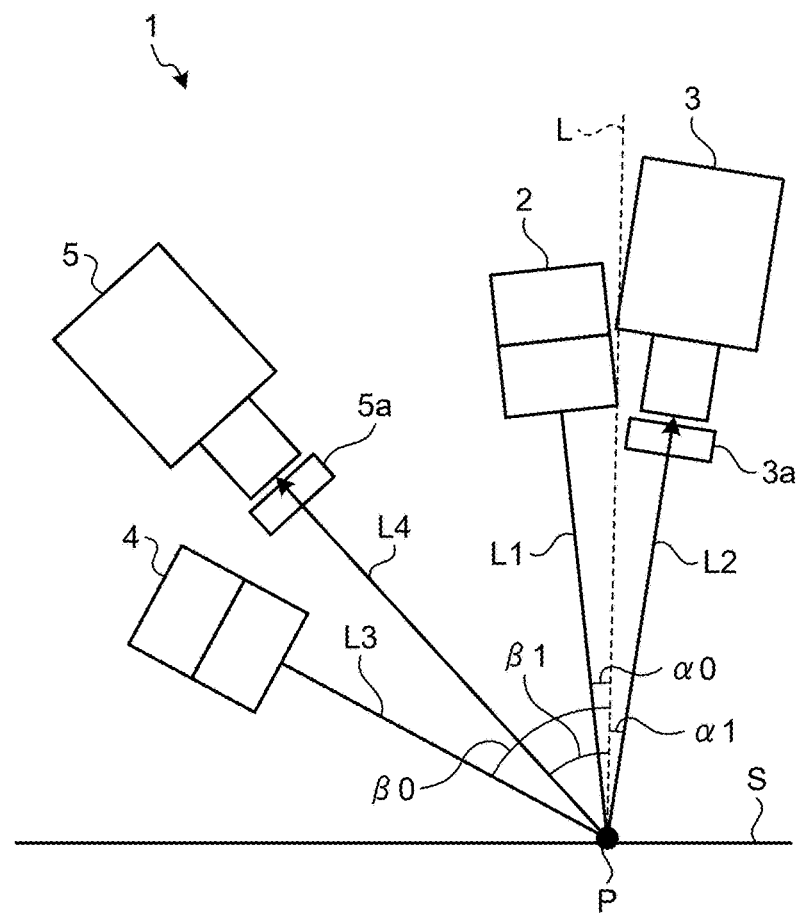
FIG. 1 is a diagram illustrating a configuration of a surface inspection device that is one embodiment of the present invention.
FIG. 2 is a diagram illustrating a detection principle of an uneven defect.

In the surface inspection device and the surface inspection method of a metal strip according to the present invention, a metal strip in an arbitrary process after a hot rolling process is the inspection target. Note that, at least after the hot rolling process, the thin steel plate is wound into a coil shape and then the processing in each process is performed, and thus, in the present embodiment, the thin steel plate is referred to as a "metal strip". However, the present invention can be applied not only to thin steel plates but also to steel plates processed in the form of sheets such as thick steel plates. In addition, the inspection target of the present invention is not limited to a steel material, and a metal strip containing aluminum, copper, and the like is also an inspection target.

Specifically, the present invention can be applied to any position from the inlet side to the outlet side in the facility of each of the hot rolling process, the pickling process, the cold rolling process, the continuous annealing process, the plating process, and the temper rolling process as the manufacturing process of inspecting the surface defect. In addition, the present invention can also be applied to a final inspection process of performing quality assurance of a metal strip.

The surface defect to be detected by the surface inspection device according to the present embodiment can be roughly classified into two types called an uneven defect and a patterned defect.

The uneven defect is a defect in which a concave portion, a convex portion, or a plurality of uneven shapes are formed on the surface, and refers to a defect in which the uneven shape can be visually recognized to some extent. Specifically, it refers to a defect having a circular shape, an elliptical shape, a streak shape, or an irregular shape with a diameter of about 0.1 to 1.0 mm when viewed from the surface of the metal strip, and having a depth of a concave portion (or a height of a convex portion) of about 5 to 1000 μm. However, the upper limit of the size and depth (height) of the defect may be the above size. Conventionally, they are classified more finely, and may be referred to as dents, texturing flaws, crimping flaws, and the like. A dent refers to a bite-like concave defect generated when a hard foreign substance is wound in the middle of threading. A texturing flaw is a defect in which unevenness (texturing line) of a rolling roll is not transferred to a portion of a metal strip in a rolling process (cold rolling process or temper rolling process) using a rolling roll subjected to texturing. This is caused by abrasion of the rolling roll, adhesion of a foreign substance to the rolling roll, and the like. The crimping flaw is a defect caused by adhesion of a part between layers of the coil and peeling of the adhesion portion when batch annealing is performed on the metal strip in the state of the coil.

On the other hand, the patterned defect is a defect that can be visually recognized as a non-uniform color tone on the surface of the metal strip. Even a patterned defect may be formed from fine unevenness when microscopically observed. Here, the height of the unevenness is less than 5 µm. For example, when the surface of the metal strip is subjected to plating treatment, the precipitated state of the metal particles of the plating film is different from other portions, and thus may be recognized as a patterned defect. The fine unevenness due to the thus precipitated particles scatter light of a specific wavelength or less (for example, 600 nm or less), and are observed as defects colored in brown (brown pattern) depending on the viewing angle.

There are many causes of occurrence of patterned defects. Examples include a rust pattern, a scale pattern, a brown pattern, a temper color, dirt, and the like. The rust pattern refers to a pattern in which a part of the surface of the metal strip is oxidized, and in the rolling process and the threading process, a rust-colored (color tone is different from that of other regions) pattern is formed on the surface of the metal strip although it cannot be distinguished from other portions of the metal strip as an uneven shape. The reason for the temper color is that the thickness of the oxide film on the surface partially changes during annealing of the metal strip, and the interference color generated between the surface of the oxide film and the background of the metal strip varies depending on the location in the surface of the metal strip. The types of defects for the uneven defect and the patterned defect as described above are set in advance for each manufacturing line of the metal strip, and usually, the characteristics of the defects are distinguished by visual observation of the inspection person and managed in each manufacturing line.

Note that the classification of the uneven defect and the patterned defect is based on how the defects are recognized by human vision. Therefore, even if the geometric unevenness is large, it may be determined as an unevenness defect, and if the geometric unevenness is small, it may be determined as a patterned defect, and these differences can be said to be expedient. Here, when the height (amplitude) of the undulations of the unevenness present on the surface of the metal strip is 5 µm or more, the defect is referred to as an uneven defect, and when and the height (amplitude) of the undulations of the unevenness is less than 5 µm or the when the defect observed only by a color tone or a brightness difference due to light interference and the like rather than the unevenness, the defect is referred to as a patterned defect.

[Basic Configuration of Surface Inspection Device]

FIG. 1 illustrates a configuration example of a surface inspection device of the present embodiment. As illustrated in FIG. 1, a surface inspection device 1 of the present embodiment includes, as a first optical system, a first light source unit 2 that emits emission light L1 to a metal strip S, a first imaging unit 3 that images regular reflection light L2 of the metal strip S by the emission light L1 from the first light source unit 2, and a first optical filter unit 3a that selectively transmits a wavelength component of the emission light L1 from the first light source unit 2. In addition, the surface inspection device 1 of the present embodiment includes, as a second optical system, a second light source unit 4 that emits emission light L3 to the metal strip S, a second imaging unit 5 that images irregular reflection light L4 of the metal strip S by the emission light L3 from the second light source unit 4, and a second optical filter unit 5a that selectively transmits a wavelength component of the emission light L3 from the second light source unit 4. In addition, the emission light L1 of the first light source unit 2 and the emission light L3 of the second light source unit 4 are light selected from different wavelength bands, and the emission light L1 from the first light source unit 2 and the emission light L3 from the second light source unit 4 are simultaneously applied to the same place (point P) on the surface of the metal strip S. Note that the surface inspection device 1 may not include the first optical filter unit 3a or the second optical filter unit 5a.

Here, in the first optical system, the regular reflection light L2 obtained by reflecting the emission light L1 from the first light source unit 2 on the surface of the metal strip S is imaged by the first imaging unit 3. The first optical system is suitable for detecting the uneven defect of the metal strip S. This is because, as illustrated in FIG. 2, in a case where an uneven defect is present on the surface of the metal strip S, an optical path of the regular reflection light L2 is changed by the uneven surface, in a manner that it is possible to utilize a characteristic that the intensity of the regular reflection light L2 imaged by the first imaging unit 3 is reduced as compared with the flat surface. On the other hand, in the second optical system, the irregular reflection light L4 when the emission light L3 from the second light source unit 4 is reflected on the surface of the metal strip S is imaged by the second imaging unit 5. The second optical system is suitable for detecting the patterned defect of the metal strip S. This is because, since large unevenness is not formed in the patterned defect, the change in regular reflection light is very small as compared with the observation scale, and even when the regular reflection light is imaged, the change in the light reception intensity is less likely to occur, and highly sensitive detection cannot be performed in some cases. In addition, the patterned defect may be constituted by fine unevenness having a size close to the wavelength band of light, and detection sensitivity of the patterned defect is improved by detecting scattered light due to unevenness having a size close to the wavelength band of light.

In the present embodiment, light selected from different wavelength bands is used as the emission light L1 of the first light source unit 2 and the emission light L3 of the second light source unit 4. Furthermore, the first imaging unit 3 is provided with the first optical filter unit 3a that selectively transmits a wavelength component of the emission light L1 from the first light source unit 2, and the second imaging unit 5 is provided with the second optical filter unit 5a that selectively transmits a wavelength component of the emission light L3 from the second light source unit 4. Thus, the first imaging unit 3 can capture an image of only the regular reflection light L2 of the emission light L1 from the first light source unit 2, and the second imaging unit 5 can capture an image of only the irregular reflection light L4 of the emission light L3 from the second light source unit 4. This is because light selected from different wavelength bands is selected by each imaging unit and each reflection intensity is evaluated. Thus, the first optical system can detect the uneven defect, and the second optical system can detect the patterned defect. In addition, since each surface defect is detected by the dedicated optical system, the detection sensitivity for each surface defect is improved.

Furthermore, in the present embodiment, the emission light L1 from the first light source unit 2 and the emission light L3 from the second light source unit 4 are simultaneously applied to the same place on the surface of the metal strip S. As described above, the surface defect that can be detected by the first optical system and the surface defect that can be detected by the second optical system are defects having different light reflection characteristics, and the detection of the surface defect by the first optical system and the detection of the surface defect by the second optical system can be configured independently. However, when they are installed at different positions, it is difficult to specify at which position of the metal strip the surface defect detected by each of them is generated.

According to the present embodiment, the emission light L1 from the first light source unit 2 and the emission light L3 from the second light source unit 4 are simultaneously applied to the same place on the surface of the metal strip S. Thus, by directly comparing the detection result by the first imaging unit 3 with the detection result by the second imaging unit 5, it is possible to distinguish which type of surface defect the detected surface defect belongs to. For example, in a case where the surface defect is not recognized from the image by the first imaging unit 3 and the surface defect is recognized based on the image by the second imaging unit 5, the detected surface defect can be classified into a patterned defect. Furthermore, for the surface defect having both the characteristics of the uneven defect and the patterned defect, it is possible to compare the image by the first imaging unit 3 and the image by the second imaging unit 5 to distinguish to which characteristic the surface defect is closer to.

On the other hand, in a case where the first optical system and the second optical system are arranged independently (at different positions), it is necessary to associate the defect information detected by the first optical system with the position information on the detected metal strip S, and further associate the defect information detected by the second optical system with the position information on the detected metal strip S. In this case, in order to distinguish the type of the surface defect detected in the metal strip S, a process of comparing the defect information detected by the first optical system with the defect information detected by the second optical system based on the position information on the metal strip S is required. In a case where such comparison processing of the defect information based on the position information on the metal strip S is performed on the entire surface of the metal strip S traveling at a high speed, for example, high calculation functional power and speed measurement performance are required, and the entire surface inspection device becomes expensive. In addition, by executing such comparison processing of defect information based on position information on the metal strip S, there arises a problem that defect detection cannot be performed quickly.

On the other hand, in the present embodiment, it is possible to instantaneously distinguish the type of the surface defect by arranging the optical system including the light sources having different wavelengths, the optical filters corresponding to the light sources, and the imaging units capable of imaging the respective lights at the same place. In addition, the entire device can be made compact as compared with a case where each optical system is separately arranged, and the restriction of the installation space for performing surface defect detection is relaxed.

[Arrangement of Optical System]

In the present embodiment, the first imaging unit 3 is arranged to image regular reflection light L2 of the metal strip S by the emission light L1 from the first light source unit 2. In FIG. 1, assuming that the angle of the optical axis of the first light source unit 2 with respect to a normal line L of the metal strip S is $\alpha 0$ and the angle of the optical axis of the first imaging unit 3 is $\alpha 1$, the first imaging unit 3 is arranged in a manner that the angle $\alpha 0$ and the angle $\alpha 1$ are substantially equal. However, it is desirable that the difference is 0, but it is possible to receive regular reflection light having sufficient intensity within approximately 0.5°.

On the other hand, the second imaging unit 5 is arranged to image the irregular reflection light L4 of the metal strip S by the emission light L3 from the second light source unit 4. Assuming that the angle of the optical axis of the second light source unit 4 with respect to the normal line L of the metal strip S is $\beta 0$ and the angle of the optical axis of the second imaging unit 5 is $\beta 1$, the second imaging unit 5 is arranged in a manner that the angle $\beta 0$ and the angle $\beta 1$ are not equal in order to image the irregular reflection light L4. Note that, in the example illustrated in FIG. 1, the second imaging unit 5 is arranged in a manner that the angle $\beta 0$ is larger than the angle $\beta 1$, but the second imaging unit 5 only needs to image the irregular reflection light L4, and the angle $\beta 1$ may be larger than the angle $\beta 0$. However, in order not to receive regular reflection light, an arrangement having a difference of 150 or more with respect to the optical path axis of the regular reflection light is preferable. Here, in FIG. 1, it is assumed that, for an arbitrary irradiation point P on the metal strip S, a normal line vector with respect to a plane constituted by the emission light L1 from the first light source unit 2 reflected at the irradiation point P and the regular reflection light L2 directed toward the first imaging unit 3 by regular reflection has a relationship perpendicular to a direction of the emission light L3 directed from the second light source unit 4 toward the irradiation point P.

[Light Source Unit]

In the present embodiment, light of different wavelength bands is used as the emission light L1 from the first light source unit 2 and the emission light L3 from the second light source unit 4. The different wavelength bands mean that spectral distributions (spectral distributions) of light are different from each other. A part of the spectral distribution may overlap, and the wavelength of the peak of the spectral distribution may be different. However, in order to separate and detect the regular reflection light L2 by the first light source unit 2 and the irregular reflection light L4 by the second light source unit 4 by the first imaging unit 3 and the second imaging unit 5, respectively, the peak wavelengths of the spectral distributions are preferably separated by at least 50 nm or more. More preferably, they should be separated by 100 nm or more. This is because the same place of the metal strip S is simultaneously irradiated with the light and the reflection light is separated and imaged, and the regular reflection light L2 from the first light source unit 2 and the irregular reflection light L4 from the second light source unit 4 are easily separated and imaged.

Note that, in a case where visible light is used for the light source unit, light in any wavelength band selected from colors obtained by dispersing visible light, such as purple (light having a wavelength region of 380 to 430 nm), indigo (light having a wavelength band of 430 to 460 nm), blue (light having a wavelength region of 460 to 500 nm), green (light having a wavelength region of 500 to 570 nm), yellow (light having a wavelength region of 570 to 590 nm), orange (light having a wavelength region of 590 to 610 nm), and red (light having a wavelength region of 610 to 780 nm), can be used.

In addition, as the emission light L1 and L3 from the first light source unit 2 and the second light source unit 4, not only visible light but also arbitrary light selected from wavelength bands of infrared rays and ultraviolet rays may be used. An imaging unit capable of imaging light in such a wavelength band may be provided.

Here, the emission light L1 from the first light source unit 2 is preferably light selected from a wavelength band having a longer wavelength than the emission light L3 from the second light source unit 4. This is because the uneven defect of the metal strip has larger undulations of unevenness and a pitch between unevenness compared with that of the patterned defect, and thus scattering of long wavelength light is increased, and the detection sensitivity of the uneven defect is improved. In addition, since unevenness of the patterned defect is small in undulation, irregular reflection becomes remarkable as the wavelength light is shorter, and the detection sensitivity of the patterned defect is improved.

Furthermore, light selected from a warm color wavelength band is preferably used as the emission light L1 from the first light source unit 2. In addition, light selected from a cold color wavelength band is preferably used as the emission light L3 from the second light source unit 4. Here, the "warm color" is a name in which colors are classified according to psychological effects, and refers to a color that gives a warm feeling in visible light. Specifically, the light is light observed as reddish purple, red, orange, or yellow, in which the peak wavelength is in the range of 570 to 780 nm and the light in the wavelength region of 535 nm or less is less than 10% with respect to the entire spectral distribution. On the other hand, the "cold color" refers to a color that gives a cold feeling in visible light. Specifically, the light is light observed as blue-green, blue, or purple green in which the peak wavelength is in the range of 380 to 500 nm and the light in the wavelength region of 535 nm or more is less than 10% with respect to the entire spectral distribution. This is because the surface defect device can be configured with an inexpensive device configuration by using visible light. In addition, by using visible light, it is easy to visually confirm that the same place of the surface of the metal strip is irradiated with the light.

More preferably, red light is selected as the emission light L1 from the first light source unit 2, and blue light is selected as the emission light L3 from the second light source unit 4. This is because the red light and the blue light are separated from each other in the peak of the spectral distribution and overlap is small, in a manner that it is easy to separate the regular reflection light L2 from the first light source unit 2 and the irregular reflection light L4 from the second light source unit 4. In addition, this is because red light is light in a wavelength band in which normal uneven defects of a metal strip are easily scattered, and blue light is light in a wavelength band in which normal patterned defects are easily scattered. In this case, a red LED and a blue LED can be preferably used as the light sources of the red light and the blue light, respectively. This is because a light source unit that emits light in a limited wavelength band can be configured at low cost, and it is advantageous in that power consumption of the surface inspection device can be suppressed.

Figure 3:
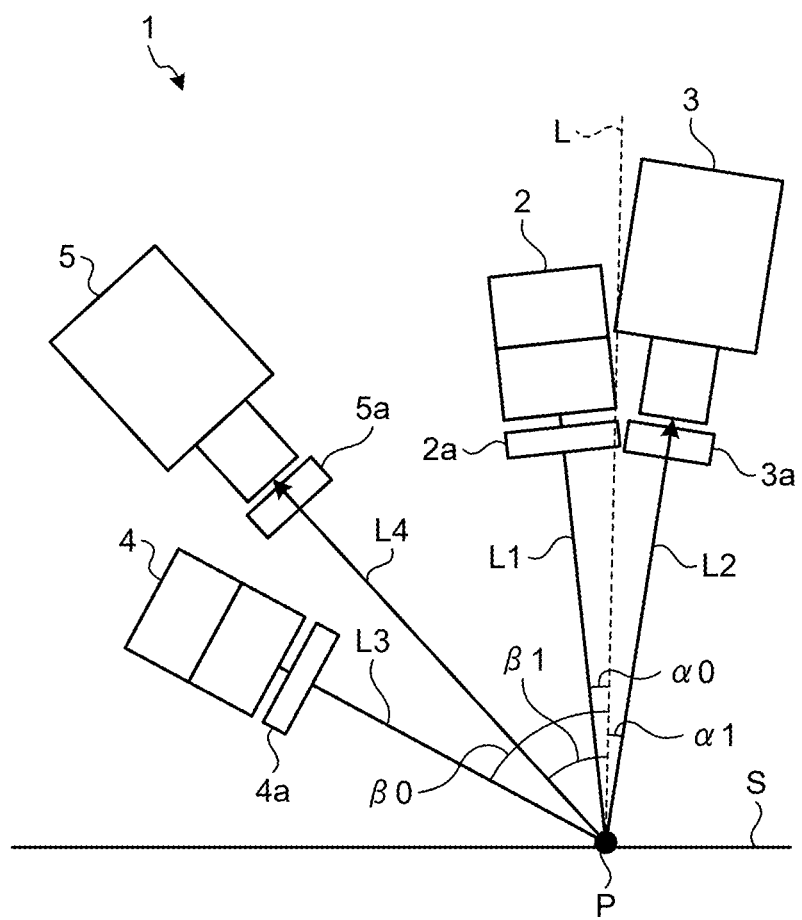
FIG. 3 is a diagram illustrating a configuration of a modification of the surface inspection device illustrated in FIG. 1.

Note that a white light source may be used as the light sources of the first light source unit 2 and the second light source unit 4. As illustrated in FIG. 3, optical filters 2a and 4a that selectively transmit light in a specific wavelength band are arranged on a path through which the first light source unit 2 and the second light source unit 4 irradiate the metal strip S with the emission light L1 and L3. Thus, at the time of being emitted from each light source unit and reaching the surface of the metal strip S, the emission light L1 and L3 are light of different wavelength bands, and the same effect as that of the above aspect can be obtained.

[Optical Filter Unit]

The first imaging unit 3 in the present embodiment is preferably provided with the first optical filter unit 3a that selectively transmits a wavelength component of the emission light L1 from the first light source unit 2. In addition, the second imaging unit 5 is preferably provided with the second optical filter unit 5a that selectively transmits a wavelength component of the emission light L3 from the second light source unit 4. By limiting the wavelength of the light incident on the imaging unit by the optical filter, it is not necessary to perform spectroscopic processing of the incident light in the imaging unit or the defect information processing unit, and thus information processing can be performed at high speed. This makes it possible to perform surface inspection on a manufacturing line in which the conveyance speed of the metal strip S is high.

The optical filter is an optical element that transmits only light in a specific wavelength range and does not transmit other light. As the optical filter, either an absorption type or a reflection type may be applied. A band pass filter that transmits only light having a wavelength corresponding to a wavelength component of emission light of each light source unit is preferable. However, a long pass filter or a short pass filter that blocks only a component on a side where the wavelength of the emission light L1 from the first light source unit 2 and the wavelength of the emission light L3 from the second light source unit 4 overlap may be applied to each of the light sources. That is, in a case where the wavelength of the emission light L1 from the first light source unit 2 is longer than the wavelength of the emission light L3 from the second light source unit 4, a long pass filter that blocks a short wavelength side may be applied to the emission light L1 from the first light source unit 2, and a short pass filter that blocks a long wavelength side may be applied to the emission light L3 from the second light source unit 4.

As the characteristics of the optical filter, one that transmits the midpoint (center wavelength) of the spectral band of the emission light from each light source unit is selected. In addition, the bandwidth of the spectral band transmitted by the optical filter is preferably equal to or wider than the spectral distribution of the emission light from each light source unit.

Figure 4:
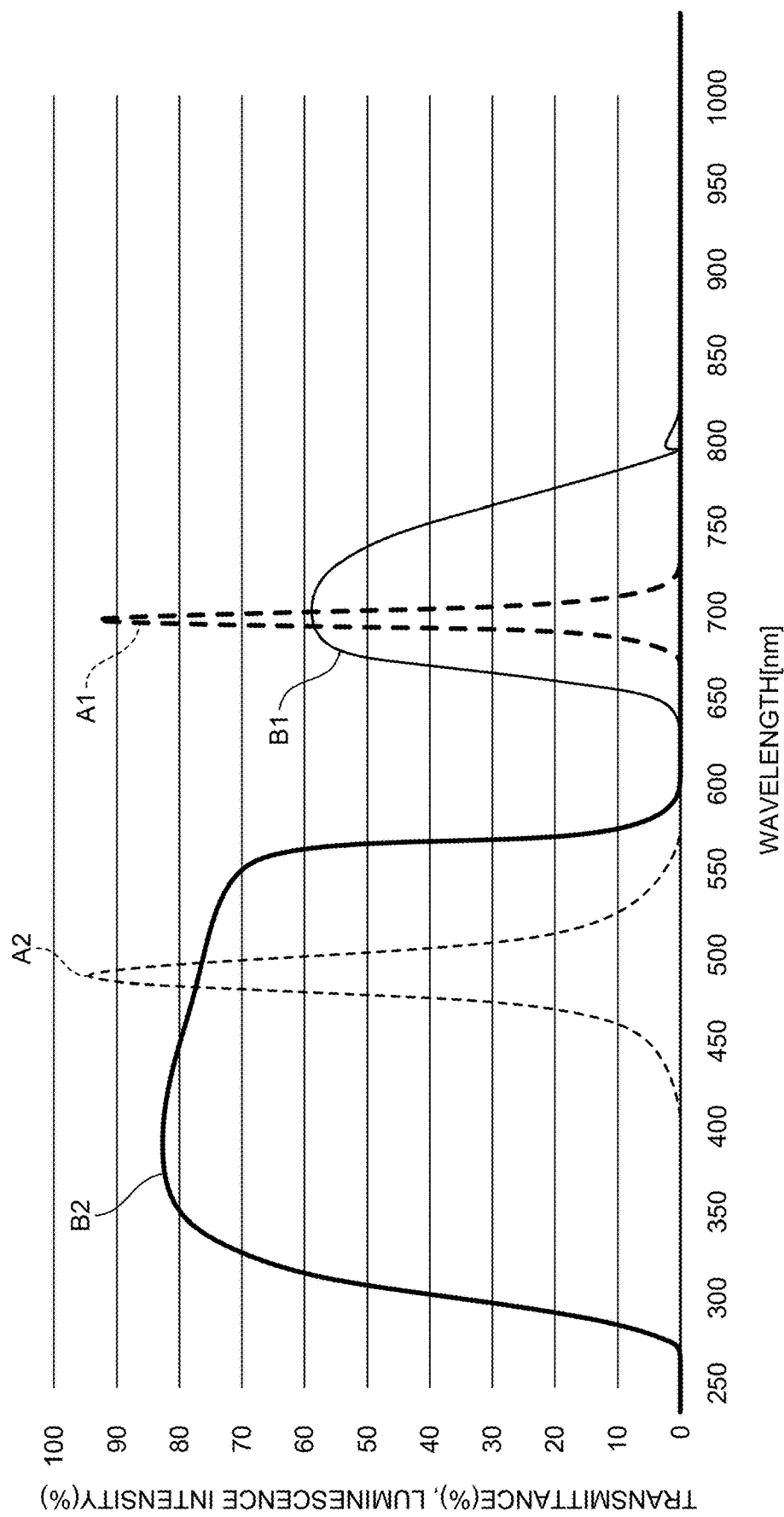
FIG. 4 is a diagram illustrating a relationship between a wavelength distribution of a light source unit and a transmission characteristic of an optical filter unit.

FIG. 4 is an example illustrating characteristics of the optical filter unit for selectively transmitting each emission light in a case where the red LED is applied to the first light source unit 2 and the blue LED is applied to the second light source unit 4. A spectral band A1 of the emission light L1 from the first light source unit 2 and the spectral band A2 of the emission light L3 from the second light source unit 4 use light in a wavelength band without overlapping. On the other hand, a spectral band B1 transmitted by the first optical filter unit 3a and a spectral band B2 transmitted by the second optical filter unit 5a include the spectral band of the emission light. In addition, the bandwidth transmitted by the optical filter has a characteristic of transmitting a wavelength in a wider range than the spectral distribution of the corresponding light source. At this time, the peak of the spectral distribution of the emission light from the light source unit does not necessarily coincide with the center wavelength of the optical filter unit. Any characteristic may be used as long as the characteristic selectively transmits a wide range of wavelengths to the extent that the spectral distribution of the light source can be covered. This is because the amount of light received by the imaging unit is increased by transmitting the reflection light covering the spectral distribution of the light source, and the detection sensitivity is improved. However, it is also possible to select a one having a narrower band width that the optical filter transmits than the spectral distribution of the light source unit. By limiting the wavelength of light received by the imaging unit, it is possible to obtain an effect that it is easy to distinguish a defect.

On the other hand, the first optical filter unit 3a and the second optical filter unit 5a in the present embodiment can be replaced by other optical components as long as the optical components have a function of selectively transmitting a wavelength component of the emission light. For example, in a case where visible light is used for the light source unit, the visible light may be dispersed using a prism as the optical filter unit, and only the dispersed light corresponding to the emission light of each light source unit may be guided to the imaging unit.

Note that, in a case where a color camera using a solid-state imaging element (CCD, CMOS) is applied as a first imaging unit and a second imaging unit, the optical filter unit has a device configuration integrated with the imaging unit. As a method for color separation by the solid-state imaging element, there are a multi-plate method and a single-plate method. In the multi-plate method, an image is color-separated by a color separation prism, and the color-separated image is converted into an electric signal by three or four solid-state imaging devices to obtain a color signal. On the other hand, in the single-plate method, an image is color-separated by a three-color or four-color on-chip color filter formed in a solid-state imaging device, and the color-separated image is converted into an electric signal by one solid-state imaging device to obtain a color signal. At this time, in a case where red light is used as the emission light L1 from the first light source unit 2 and blue light is used as the emission light L3 from the second light source unit 4, in the multi-plate method, a portion that performs color separation of an image by the color separation prism and disperses the image into red light or blue light corresponds to the optical filter unit, and a portion that converts the image into a red or blue electric signal in the solid-state imaging device corresponds to the imaging unit. In addition, in the single-plate method, a portion where an image is color-separated into red or blue by the on-chip color filter corresponds to the optical filter unit, and a portion where the color-separated image is converted into an electric signal by one solid-state imaging device to obtain a red or blue color signal corresponds to the imaging unit. Furthermore, also in the case of using an image sensor using a light diffraction phenomenon using a microspectroscopic element, color separation is performed by diffraction, and corresponds to an optical filter unit. With recent advances in semiconductor technology, equipment capable of performing high-speed processing and having functions of an optical filter unit and an imaging unit has been put into practical use, and thus, it has become possible to realize a defect detection device using a color camera even in a manufacturing line that conveys a metal strip at a high speed.

[Imaging Unit]

In the present embodiment, the surface inspection device 1 includes the first imaging unit 3 that images the regular reflection light L2 of the metal strip S by the emission light L1 from the first light source unit 2, and the second imaging unit 5 that images the irregular reflection light L4 of the metal strip S by the emission light L3 from the second light source unit 4. By individually arranging the two imaging units, it is possible to improve the detection sensitivity for each of different types of surface defects such as the uneven defect and the patterned defect. In addition, by comparing the images captured by the two imaging units, it is possible to distinguish which type of defect the detected surface defect belongs to.

Here, as the first imaging unit 3 and the second imaging unit 5, a camera capable of receiving the regular reflection light L2 or the irregular reflection light L4 and capturing the image as a moving image or a still image is used. When the surface defect is inspected while the metal strip S is conveyed in a stationary state or at a low conveyance speed, a camera that captures a still image may be used. However, in a case where surface defects are inspected while the metal strip S is conveyed at a relatively high speed (for example, about 10 to 500 m/min) as in a normal manufacturing line of the metal strip S, it is preferable to use a video camera that captures a moving image. A shutter speed of the video camera is preferably a high speed in order to cope with a metal strip conveyed at a high speed, but a shutter speed of about 60 Hz may be used. However, under the condition that the conveyance speed of the metal strip is about 500 to 2000 m/min, a high-speed camera (about 180 Hz) may be applied. When the video camera is selected, it may be appropriately determined in consideration of the conveyance speed of the metal strip, the processing time for distinguishing the detected surface defect, and the capacity and processing capacity of the storage medium for storing the detected defect information.

In addition, a digital camera is preferable as a camera used for the imaging unit. This is because if the images captured by the first imaging unit 3 and the second imaging unit 5 are digital images, it is easy to superimpose the images on each other, and the characteristics of the detected surface defect can be grasped in more detail. Furthermore, in a case where the imaging unit includes a color digital camera, the captured color image may be color-separated to extract light receiving components of the wavelengths of the first light source unit 2 and the second light source unit 4.

On the other hand, in the present embodiment, since the surface inspection device 1 includes the first optical filter unit 3a and the second optical filter unit 5a, a monochrome digital camera can be applied to the first imaging unit 3 and the second imaging unit 5. This is because light in a wavelength band corresponding to the light source unit is transmitted by the first optical filter unit 3a and the second optical filter unit 5a, and thus, if intensity information of the received light is obtained in the imaging unit, each of the uneven defect and the patterned defect can be recognized. Since the shutter speed of the monochrome digital camera is fast, it is possible to detect surface defects at a high speed, and it is possible to suppress the facility cost of surface defect detection.

[Line Light Source]

In the present embodiment, the first light source unit 2 and the second light source unit 4 are preferably linear light sources that linearly irradiate the surface of the metal strip S. In addition, in a case where the surface of the metal strip S is irradiated with the linear light sources of the first light source unit 2 and the second light source unit 4, the linear light sources are preferably arranged to be emitted in a direction perpendicular to the conveyance direction of the metal strip S. However, it is not necessarily perpendicular (90°) as long as it is at an angle of 70 to 120° with respect to the conveyance direction of the metal strip S. In a case where the surface defect is detected while the metal strip S is conveyed, linear light is emitted in the width direction of the metal strip S, and the reflection light is detected by a digital camera, in a manner that the surface defect at an arbitrary position in the width direction of the metal strip S can be detected. In addition, by acquiring an image corresponding to the shutter speed of the digital camera, it is possible to generate a continuous surface image in the longitudinal direction of the metal strip S, and it is possible to inspect the surface defect on the entire surface of the metal strip S.

The linear light is not limited to a line light source, and refers to a light source that irradiates a rectangular range with light with respect to the metal strip S, in which the irradiation range in a direction of one side is 10 times or more longer than the irradiation range of the other side. In the present embodiment, it is preferable to irradiate a range at least longer than the width direction of the metal strip S in the long side direction of the rectangular irradiation range. However, it is not always necessary to irradiate the width (about 400 to 2000 mm) of the metal strip S with one light source. A plurality of light sources may be arranged in the width direction of the metal strip S to irradiate the metal strip S with light.

In addition, the emission light from the first light source unit 2 and the second light source unit 4 is emitted to the same place on the surface of the metal strip S. However, there may be a region where the irradiation light does not partially overlap, for example, ranges in the width direction of the metal strip S of the first light source unit 2 and the second light source unit 4 are different. This is because the surface defect inspection in the above aspect can be performed in the region where the irradiation light overlaps. The same applies to a case where there is a region where the irradiation light does not overlap in a part of the region on the short side of the irradiation light.

Note that, in a case where a line light source is used, a line scan camera or an area camera can be applied to the first imaging unit 3 and the second imaging unit 5. The line scan camera is suitable for capturing linear light, and an area camera is preferable in the case of a rectangular irradiation region.

Figure 5:
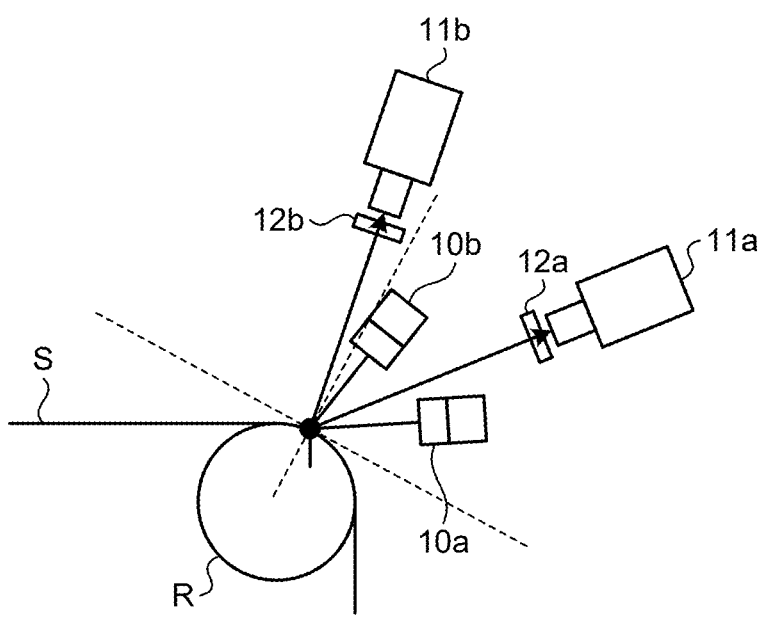
FIG. 5 is a diagram illustrating a device arrangement example when the surface inspection device according to one embodiment of the present invention is applied to surface inspection.

FIG. 5 illustrates a configuration example of the surface inspection device in the case of using the linear light source. In the configuration example illustrated in FIG. 5, a roll R wound when the metal strip S is conveyed is used in the processing step of the metal strip S. In FIG. 5, reference numeral 10a denotes a short wavelength monochromatic light source, reference numeral 10b denotes a long wavelength monochromatic light source, reference numeral 11a denotes a dark field (DF) line scan camera, reference numeral 11b denotes a bright field (BF) line scan camera, reference numeral 12a denotes a short wavelength filter, and reference numeral 12b denotes a long wavelength filter. By winding the metal strip S around the roll R, flapping of the metal strip S during conveyance can be prevented, and stable reflection light can be obtained.

[Arrangement of Light Source Unit and Imaging Unit]

Figure 6:
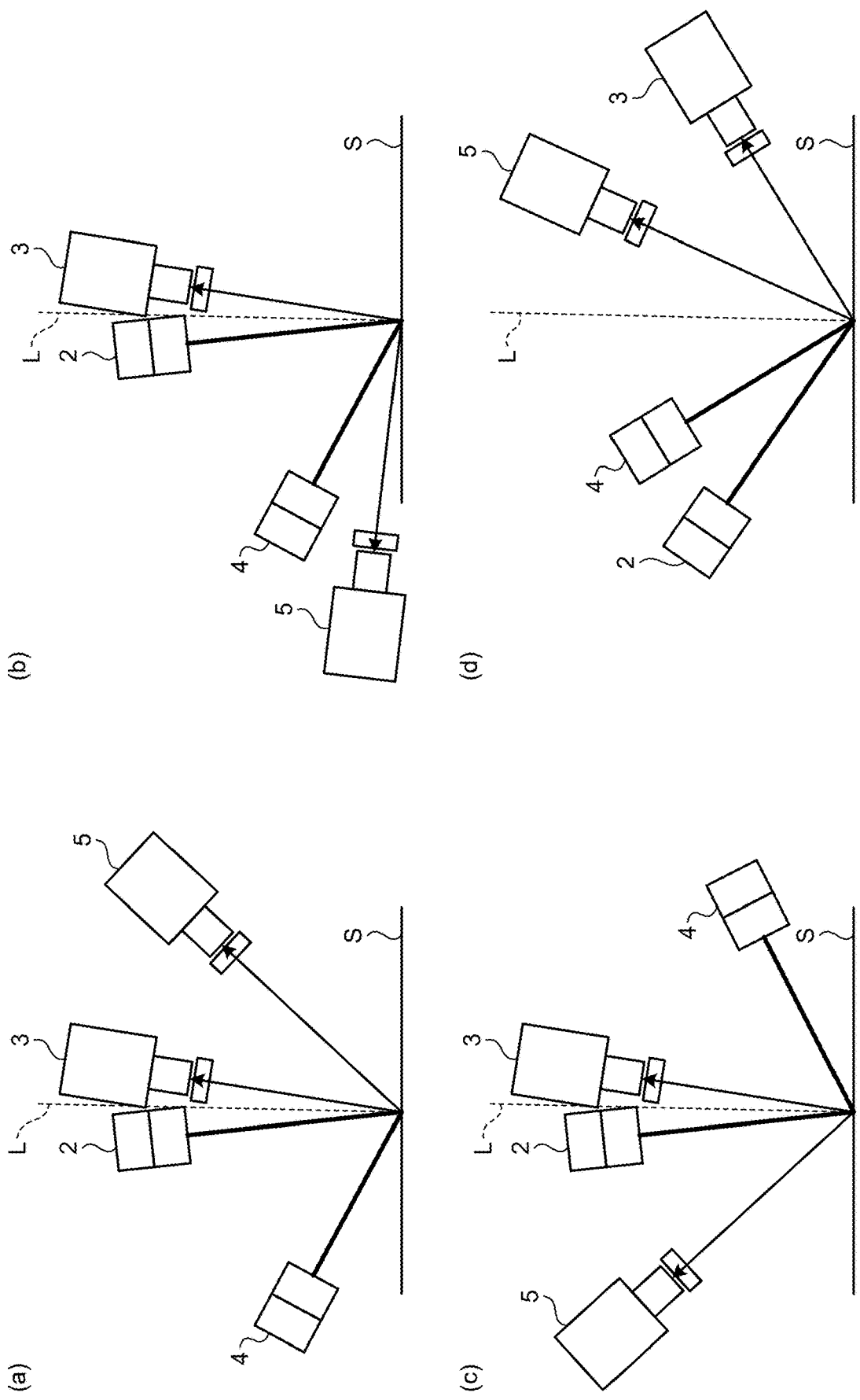
FIG. 6 is a diagram illustrating a modification of the device arrangement example illustrated in FIG. 5.

The arrangement illustrated in FIG. 6 can be applied to the arrangement of the light source unit and the imaging unit in the present embodiment in addition to the arrangement illustrated in FIG. 1. For example, as illustrated in FIG. 6(a), the second light source unit 4 and the second imaging unit 5 can be arranged on the opposite side with respect to the normal line L of the metal strip S. However, since the second imaging unit 5 images irregular reflection light, the second imaging unit 5 is not arranged at a position where regular reflection light of the second light source unit 4 is received (a position where the angle $\beta_1$ illustrated in FIG. 1 is substantially equal to the minus angle $\beta_0$). In addition, the magnitude relationship between the incident angle of the emission light from the second light source unit 4 and the angle of the optical axis of the second imaging unit 5 and the angle between the first light source unit 2 and the first imaging unit 3 is not a problem, and can be appropriately selected.

At this time, the incident angle $\beta_0$ of the emission light from the second light source unit 4 to the metal strip is preferably larger than the incident angle $\alpha_0$ of the emission light from the first light source unit 2. However, it is not necessary to arrange the second imaging unit 5 on the same side with respect to the normal line L of the metal strip S as described above. This is because the detection sensitivity of the patterned defect detected by the second optical system is improved as the incident angle $\beta_0$ of the emission light is larger, and the noise influence by the regular reflection light is attenuated in proportion to the incident angle $\beta_0$. In addition, in a case where the regular reflection light from the first light source unit 2 is imaged by the first imaging unit 3, the degree of influence of the reflection light of the emission light from the second light source unit 4 toward the first optical filter unit 3a is reduced, and the surface defect can be easily distinguished.

On the other hand, the incident angle $\alpha_0$ of the emission light from the first light source unit 2 and the angle $\alpha_1$ formed by the optical axis of the first imaging unit 3 with respect to the normal line L of the metal strip S are preferably angles of 0° or more and 75° or less. This is because when the incident angle of the emission light from the first light source unit 2 increases, the irradiation area with respect to the plate surface increases due to shallow incidence, and thus, the amount of reflection light per unit area of the surface of the metal strip decreases, the imaging conditions deteriorate, and in addition, the metal strip is easily affected by disturbance such as vibration and thickness fluctuation of the metal strip. Note that the incident angle of the emission light from the first light source unit 2 may be 0°. In that case, it is possible to adopt a coaxial epi-illumination mode in which a half mirror is arranged in the middle of the optical path in a manner that the optical path is in a different direction only for the regular reflection light that returns, and the first imaging unit 3 is arranged at the position of the optical path.

Furthermore, the optical axis of the second imaging unit 5 is preferably at an angle of 20° or more and less than 90° with respect to the normal line L of the metal strip S. The reason why the optical axis of the second imaging unit 5 is set to 20° or more with respect to the normal line L of the metal strip S is that, in a case where the incident angle $\alpha_0$ of the emission light from the first light source unit 2 is set to be small, device arrangement of the second optical system becomes easy. In addition, it is based on the finding that the detection sensitivity of the patterned defect of the metal strip S is particularly improved. Note that the reason why the arrangement in which the angle $\beta_1$ formed by the optical axis of the second imaging unit 5 and the normal line L of the metal strip S is 90° is not adopted is that there is a case where irregular reflection light from the second light source unit 4 cannot be received unless the camera of the second imaging unit 5 is installed with very high accuracy.

In a case where the metal strip S is a plated steel plate, the incident angle $\alpha_0$ of the emission light from the first light source unit 2 and the angle $\alpha_1$ formed by the optical axis of the first imaging unit 3 with respect to the normal line L of the metal strip S are more preferably angles of 0° or more and 45° or less. In addition, the optical axis of the second imaging unit 5 is more preferably at an angle of 30° or more and less than 90° with respect to the normal line L of the metal strip S. This is because, depending on the type of plating to be applied to the surface of the metal strip S and the film thickness, the incident angle $\alpha 0$ of the emission light from the first light source unit 2 is reduced to improve the detection sensitivity for the uneven defect, and the optical axis of the second imaging unit 5 is 30° or more to improve the detection sensitivity for the patterned defect. For example, for the metal strip S to which thin film plating is applied by the electroplating line, the incident angle $\alpha 0$ of the emission light from the first light source unit 2 and the angle $\alpha 1$ formed by the optical axis of the first imaging unit 3 with respect to the normal line L of the metal strip S may be set to 5° or more and 20° or less. In addition, the optical axis of the second imaging unit 5 may be at an angle of 45° or more and less than 85° with respect to the normal line L of the metal strip S.

[Defect Information Processing Unit]

Figure 7:
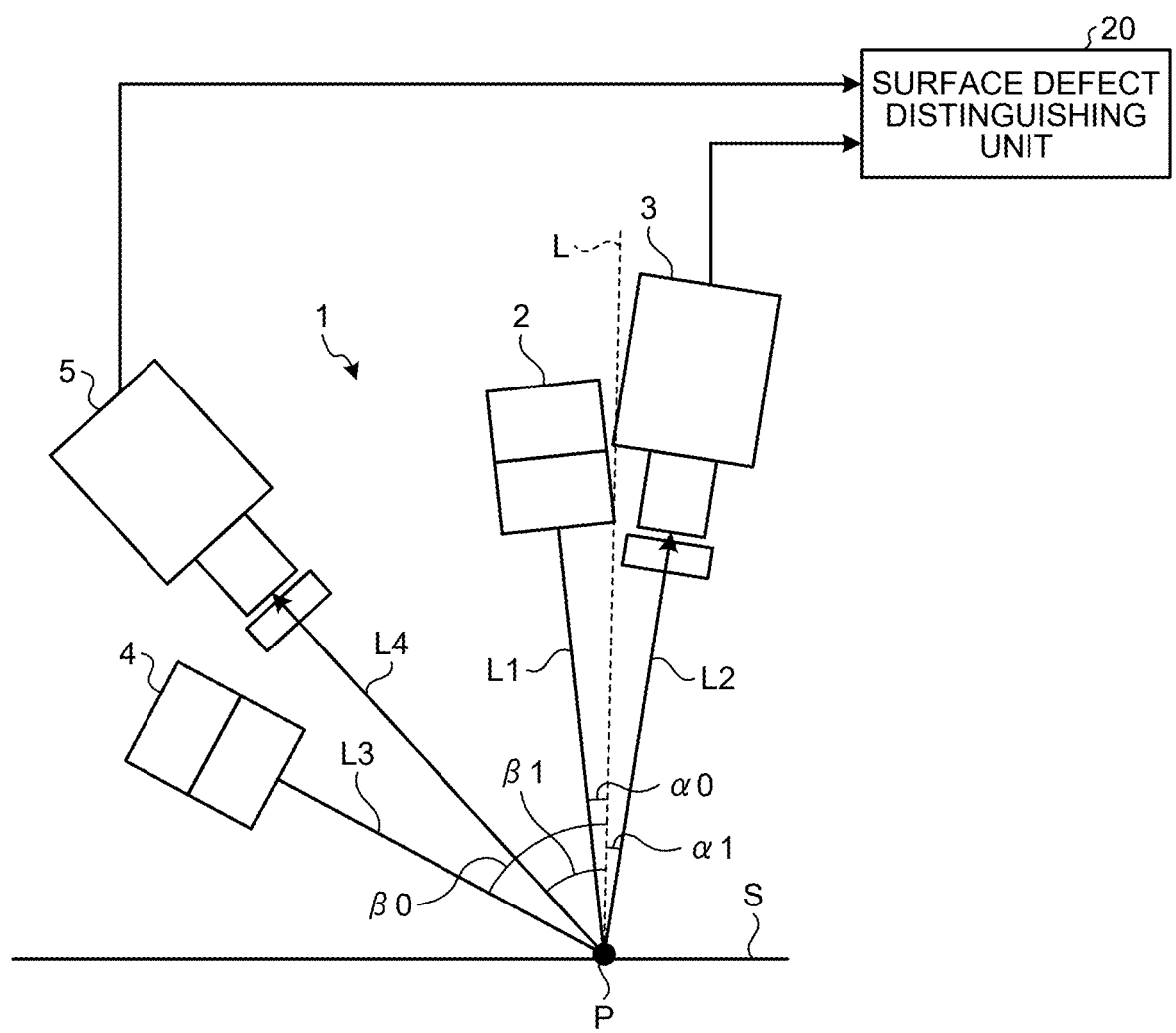
FIG. 7 is a diagram illustrating a configuration of a surface inspection device including a surface defect distinguishing unit.

In the present embodiment, in the device configuration in which the first optical system and the second optical system are combined as described above, whether the defect detected on the surface of the metal strip S is an uneven defect or a patterned defect can be distinguished from the image captured by the first imaging unit 3 and the image captured by the second imaging unit 5 by an image. Furthermore, in the above configuration, as illustrated in FIG. 7, the surface inspection device 1 includes a surface defect distinguishing unit 20 that distinguishes the surface defect of the metal strip S using the image captured by the first imaging unit 3 and the image captured by the second imaging unit 5.

In this case, the emission light L1 from the first light source unit 2 and the emission light L3 from the second light source unit 4 are simultaneously applied to the same place (point P) on the surface of the metal strip S, and the regular reflection light L2 from the first light source unit 2 is imaged by the first imaging unit 3 and the irregular reflection light L4 from the second light source unit 4 is imaged by the second imaging unit 5. The image captured in this manner is an image when the surface of the metal strip S is simultaneously irradiated, and these images are sent to the surface defect distinguishing unit 20.

The surface defect distinguishing unit 20 includes, for example, a general-purpose computer such as a workstation or a personal computer. The surface defect distinguishing unit 20 includes an uneven defect determination unit, a patterned defect determination unit, and a storage unit. The uneven defect determination unit and the patterned defect determination unit are, for example, a CPU and the like, and execute predetermined calculation to realize the functions of the uneven defect determination unit and the patterned defect determination unit using a computer program and data stored in the storage unit.

Specifically, the processing in the uneven defect determination unit and the patterned defect determination unit can be performed as follows. FIG. 8 is a diagram illustrating an example of defect information processing according to the present embodiment. This is an example in which a line light source is used as a light source unit, and scanning is performed in the width direction of the metal strip by a line scan camera to capture an image.

In the defect information processing of the present embodiment, first, the surface defect distinguishing unit 20 acquires the scan information of the regular reflection light L2 acquired by the first imaging unit 3 in the width direction of the metal strip and the scan information of the irregular reflection light L4 acquired by the second imaging unit 5 in the width direction of the metal band. Both pieces of scan information are acquired as light reception intensity information as illustrated in FIG. 8 (*a*). The light reception intensity information is information of light intensity of a specific wavelength band acquired by the imaging unit, and refers to information in which a correspondence relationship with a position in the width direction of a metal strip to be inspected is specified. FIG. 8(*a*) illustrates, as a chart image, the relationship between the position in the width direction of the metal strip and the intensity (light intensity in a specific wavelength band). However, the light reception intensity information is not necessarily in the form of a chart image as long as the correspondence relationship between the light intensity and the position in the width direction of the metal strip is specified. On the other hand, in a case where the light reception intensity information has an unavoidable distribution in the width direction associated with the configuration of the optical system (in a case where the light reception intensity information has a constant distribution in the width direction even in a state where there is no surface defect in the metal strip), the surface defect distinguishing unit 20 may apply shading correction to the light reception signal as preprocessing to reduce an error of the light reception signal generated in the imaging unit due to the characteristics of the optical system and set it as the received light intensity information. At this time, within the measurement range corresponding to the width of the metal strip illustrated in FIG. 8(*a*), the distribution of the light reception intensity is compared with upper and lower threshold values (allowable range) set in advance corresponding to the respective defects. Then, in a case where a portion outside the allowable range occurs in the light reception intensity, the portion is stored in the storage unit as a defect candidate. Here, the information regarding the defect candidate generated in this manner is referred to as defect candidate information. The defect candidate information is information in which the position in the width direction of the metal strip at which the light reception intensity information exceeds the upper and lower limit threshold values is associated with the magnitude of the light reception intensity at the position (for example, a deviation from the threshold). Similarly to the light reception intensity information, the defect candidate information may be stored in the storage unit as the format of the chart image.

Next, the surface defect distinguishing unit 20 continuously acquires defect candidate information with respect to the longitudinal direction of the metal strip, and acquires a continuous image (two-dimensional image) obtained by combining the defect candidate information at a certain distance (FIG. 8 (*b*)). For example, in a case where a line scan camera is used as the imaging unit, a chart image is acquired as light reception intensity information by the first imaging unit 3 and light reception intensity information by the second imaging unit 5 corresponding to the first line scan, and first defect candidate information is generated from each chart image. Next, when the second line scan is performed along with the conveyance of the metal strip, a chart image is acquired as light reception intensity information by the first imaging unit 3 and light reception intensity information by the second imaging unit 5, and second defect candidate information is generated from each chart image. In this way, when the line scanning is performed from a1 to aN, the defect candidate information from a1 to aN obtained from the first imaging unit 3 and the defect candidate information from a1 to aN obtained from the second imaging unit 5 are generated. The diagram illustrated on the left side of FIG. 8(*b*) schematically illustrates defect candidate information from a1 to aN as the defect candidate information obtained by the first imaging unit 3. Then, the defect candidate information is converted into a two-dimensional image as illustrated on the right side of FIG. 8 (*b*). That is, the position in the width direction of one piece of defect candidate information is allocated to the pixel divided in the width direction of the two-dimensional image, and the magnitude of the light reception intensity at each position in the width direction is converted into information such as brightness and color according to the section of the received light intensity set in advance, and is allocated to the pixel of the two-dimensional image. Then, the defect candidate information from a1 to aN is sequentially allocated to the pixels in the vertical direction of the two-dimensional image, generating the two-dimensional image illustrated on the right side of FIG. 8 (*b*). Similarly, a two-dimensional image based on the defect candidate information acquired from the second imaging unit 5 is also generated, and any two-dimensional image is stored in the storage unit. Note that, in a case where an area camera is used as the imaging unit, it is possible to generate a two-dimensional image similar to the two-dimensional image illustrated in FIG. 8(*b*) by performing image processing of removing an overlapping portion of images continuously captured in the longitudinal direction. Note that, in a case of generating a two-dimensional image, it is preferable to obtain a two-dimensional image with shading by allocating 265 levels of brightness according to the intensity (deviation intensity from the average value) of the light reception signal. The two-dimensional image related to the defect candidate information may be generated as needed during the conveyance of the metal strip, or may be generated offline using the light reception intensity information accumulated in the storage unit.

Next, the surface defect distinguishing unit 20 refers to the two-dimensional image of the portion identified as the defect candidate (the two-dimensional image related to the defect candidate information), specifies a region where the non-uniformity of the brightness distribution occurs in its periphery, and determines whether or not the portion is a defect. At this time, the spread of the region where the brightness is non-uniform (the range of pixels having similar brightness) corresponds to the size of the defect. In addition, the difference in tone (difference from the background) of the brightness corresponds to the degree (severity) of the defect. The defect determination processing flow described above is executed for each of the uneven defect determination unit (the defect determination unit based on the light reception intensity information acquired from the first imaging unit) and the patterned defect determination unit (the defect determination unit based on the light reception intensity information acquired from the second imaging unit). However, the upper and lower limit threshold values illustrated in FIG. 8(*a*) may be set in a manner that a defect recognized by visual observation can be detected corresponding to each defect.

In addition, the surface defect distinguishing unit 20 may store the characteristic amount of the image corresponding to the type of the defect in the database in advance as the defect database corresponding to the distribution of the brightness of the two-dimensional image acquired as described above (FIG. 8 (*c*)). By associating the characteristic of the defect detected in the actual operation with the characteristic amount of the two-dimensional image, the name of the defect can be specified by referring to the defect database from the detected two-dimensional image. Furthermore, the degree (severity) of the detected defect can be automatically determined by making a defect database in which the degree (severity) of the defect and the characteristic amount of the two-dimensional image are associated with each other for each defect. Note that the distinguishing the defect name and determining the severity can be performed by various methods as long as a two-dimensional image as illustrated in FIG. 8(*b*) can be acquired. For example, by generating a machine learning model with an image as an input and a defect name and its severity as an output by a method such as deep learning or a convolutional neural network, it is possible to perform defect distinguishing and severity determination from a two-dimensional image.

At this time, in a case where the defect is determined to be any of the defects, the determination information on the degree (severity) and the type of the surface defect and the position information on the metal strip in which the defect is detected are associated and accumulated in the storage unit. In addition, by outputting the defect information as the screen information of the control room, it is possible to urge the operator to change the production process based on the defect information or to take a measure necessary for securing the quality of the metal strip.

Note that, in the above description, the surface defect distinguishing unit 20 may divide a hardware configuration into two, which are a surface defect information detection unit that generates defect candidate information and generates a two-dimensional image related to the defect candidate information, and a surface defect information detection unit (an uneven defect determination unit and a patterned defect determination unit) that determines whether or not a defect is present based on the two-dimensional image related to the defect candidate information. This is because the former requires high-speed processing to execute online processing, and the latter executes offline processing, and thus they are different in required hardware performance. Furthermore, the surface defect information detection unit may be installed in a plurality of manufacturing lines, and the surface defect information distinguishing unit may be configured on a server. The surface defect information distinguishing unit on the server may collectively distinguish the surface defect based on the two-dimensional image related to the defect candidate information acquired from the plurality of manufacturing lines. The defect can be distinguished on different manufacturing lines under a unified standard, and variations in defect distinguishing can be reduced. In addition, the surface defect distinguishing unit 20 may further include a more detailed defect analysis function such as a distribution form of an uneven defect and a patterned defect inside a region determined to be a defect by superimposing an image captured by the first imaging unit 3 and an image captured by the second imaging unit 5.

EXAMPLES

The present invention was carried out in accordance with the embodiment illustrated in FIG. 1. As the metal strip to be inspected, a galvanized steel plate obtained by galvanizing a steel plate having a plate thickness of 0.5 mm and a plate width of 1000 mm was used. In the present invention example, red light and blue light were simultaneously emitted to the same place with red light emitted from a red light source including a red LED and blue light emitted from a blue light source including a blue LED, regular reflection light of the red light was received and captured by the first imaging unit including a digital monochrome camera via a red filter, and irregular reflection light of the blue light was received and captured by the second imaging unit including a digital monochrome camera via a blue filter. At this time, the second imaging unit is arranged in a manner that the principal ray of the irregular reflection light forming an angle of 30 degrees with the optical axis of the blue light source coincides with the optical axis of the second imaging unit. Then, the presence of the uneven defect was detected by observing the captured image of the regular reflection light of the red light by the first imaging unit and identifying the massive dark portion and/or the massive bright portion as the uneven defect, and the presence of the patterned defect was detected by observing the captured image of the irregular reflection light of the blue light by the second imaging unit and identifying the bright portion as the patterned defect. On the other hand, in the comparative example, in place of each of the red light source and the blue light source in the present invention example, a white light source that emits white light was used, and the red filter and the blue filter were removed, and the other conditions were the same as those in the present invention example.

FIG. 9 illustrates captured images of uneven defects in the present invention example and the comparative example. In FIG. 9, black portions indicate uneven defects. As illustrated in FIG. 9(a), the uneven defect is detected also in the comparative example, but its contour is blurred. On the other hand, as illustrated in FIG. 9(b), in the present invention example, it can be seen that the contour of the uneven defect had become clearer and the detection reliability has improved. In addition, FIG. 10 illustrates captured images of patterned defects in the present invention example and the comparative example. In FIG. 10, white portions are patterned defects. As illustrated in FIG. 10(a), in the comparative example, the image of the patterned defect is unclear, and it is difficult to detect the patterned defect. On the other hand, as illustrated in FIG. 10(b), in the present invention example, the image of the patterned defect is remarkably clear, and it can be seen that the presence of the patterned defect can be detected at a glance. In addition, FIGS. 9(b) and 10(b) illustrate that both the uneven defect and the patterned defect were clearly detected in the present invention example.

One embodiment that is one application of the present invention made by the inventors has been explained above, but the present invention is not limited to the descriptions and the drawings making up the disclosure by the embodiment of the present invention. In other words, other embodiments, examples, operation technologies, and the like made by those skilled in the art on the basis of the embodiment all fall within the scope of the present invention.

INDUSTRIAL APPLICABILITY

According to the present invention, it is possible to provide a surface inspection device and a surface inspection method of a metal strip capable of improving detection accuracy for different types of surface defects such as an uneven defect and a patterned defect and distinguishing the type of the surface defect. In addition, according to the present invention, it is possible to provide a manufacturing method of a metal strip capable of improving the manufacturing yield of the metal strips.

REFERENCE SIGNS LIST

1 SURFACE INSPECTION DEVICE
2 FIRST LIGHT SOURCE UNIT
3 FIRST IMAGING UNIT
3a FIRST OPTICAL FILTER UNIT
4 SECOND LIGHT SOURCE UNIT
5 SECOND IMAGING UNIT
5a SECOND OPTICAL FILTER UNIT
20 SURFACE DEFECT DISTINGUISHING UNIT
L NORMAL LINE
L1, L3 EMISSION LIGHT
L2 REGULAR REFLECTION LIGHT
L4 IRREGULAR REFLECTION LIGHT
S METAL STRIP

The invention claimed is:

1. A surface inspection device of a metal strip, comprising:
   a first light source unit configured to emit light to a surface of a metal strip;
   a first imaging unit configured to image regular reflection light on the surface of the metal strip by emission light from the first light source unit;
   a second light source unit configured to emit light of a wavelength band different from the emission light of the first light source unit to the surface of the metal strip, wherein the first light source unit and the second light source unit are arranged such that an incident angle of the emission light from the first light source unit differs from an incident angle of emission light from the second light source unit;
   a second imaging unit configured to image irregular reflection light on the surface of the metal strip by the emission light from the second light source unit, wherein an optical axis of the first imaging unit with respect to a normal line of the metal strip and an optical axis of the second imaging unit with respect to the normal line of the metal strip differ; and
   a surface defect distinguishing unit configured to distinguish a surface defect of the metal strip by using the regular reflection light imaged by the first imaging unit and irregular reflection light imaged by the second imaging unit, wherein
   the emission light from the first light source unit and the emission light from the second light source unit are simultaneously applied to a same place on the surface of the metal strip.

2. The surface inspection device of a metal strip according to claim 1, wherein
   the first imaging unit includes a first optical filter unit configured to selectively transmit a wavelength component of the emission light from the first light source unit, and
   the second imaging unit includes a second optical filter unit configured to selectively transmit a wavelength component of the emission light from the second light source unit.

3. The surface inspection device of a metal strip according to claim 1, wherein the emission light from the first light source unit is light selected from a wavelength band having a longer wavelength than the emission light from the second light source unit.

4. The surface inspection device of a metal strip according to claim 1, wherein the emission light from the first light source unit is light selected from a warm color wavelength band, and the emission light from the second light source unit is light selected from a cold color wavelength band.

5. The surface inspection device of a metal strip according to claim 1, wherein the incident angle of the emission light from the second light source unit to the metal strip is larger than the incident angle of the emission light from the first light source unit to the metal strip.

6. The surface inspection device of a metal strip according to claim 1, wherein the optical axis of the first imaging unit is at an angle of 0° or more and 75° or less with respect to the normal line of the metal strip, and the optical axis of the second imaging unit is at an angle of 20° or more and less than 90° with respect to the normal line of the metal strip.

7. The surface inspection device of a metal strip according to claim 1, wherein the first light source unit and the second light source unit are linear light sources configured to linearly irradiate the surface of the metal strip with light.

8. A surface inspection method of a metal strip, comprising:
   a first emission step of emitting light to a surface of a metal strip using a first light source unit;
   a first imaging step of imaging regular reflection light on the surface of the metal strip by emission light from the first light source unit using a first imaging unit;
   a second emission step of emitting light of a wavelength band different from that of the emission light of the first light source unit to the surface of the metal strip using a second light source unit, wherein the first light source unit and the second light source unit are arranged such that an incident angle of the emission light from the first light source unit differs from an incident angle of emission light from the second light source unit;
   a second imaging step of imaging irregular reflection light on the surface of the metal strip by the emission light from the second light source unit using a second imaging unit, wherein an optical axis of the first imaging unit with respect to a normal line of the metal strip and an optical axis of the second imaging unit with respect to the normal line of the metal strip differ; and
   a step of distinguishing a surface defect of the metal strip by using the regular reflection light imaged in the first imaging step and irregular reflection light imaged in the second imaging step, wherein
   the emission light from the first light source unit and the emission light from the second light source unit are simultaneously applied to a same place on the surface of the metal strip.

9. The surface inspection method of a metal strip according to claim 8, wherein
   the first imaging unit includes a first optical filter unit that selectively transmits a wavelength component of the emission light from the first light source unit, and
   the second imaging unit includes a second optical filter unit that selectively transmits a wavelength component of the emission light from the second light source unit.

10. A manufacturing method of a metal strip, comprising: a step of manufacturing a metal strip while distinguishing the surface defect of the metal strip using the surface inspection method of a metal strip according to claim 8.

* * * * *